Patented May 29, 1951

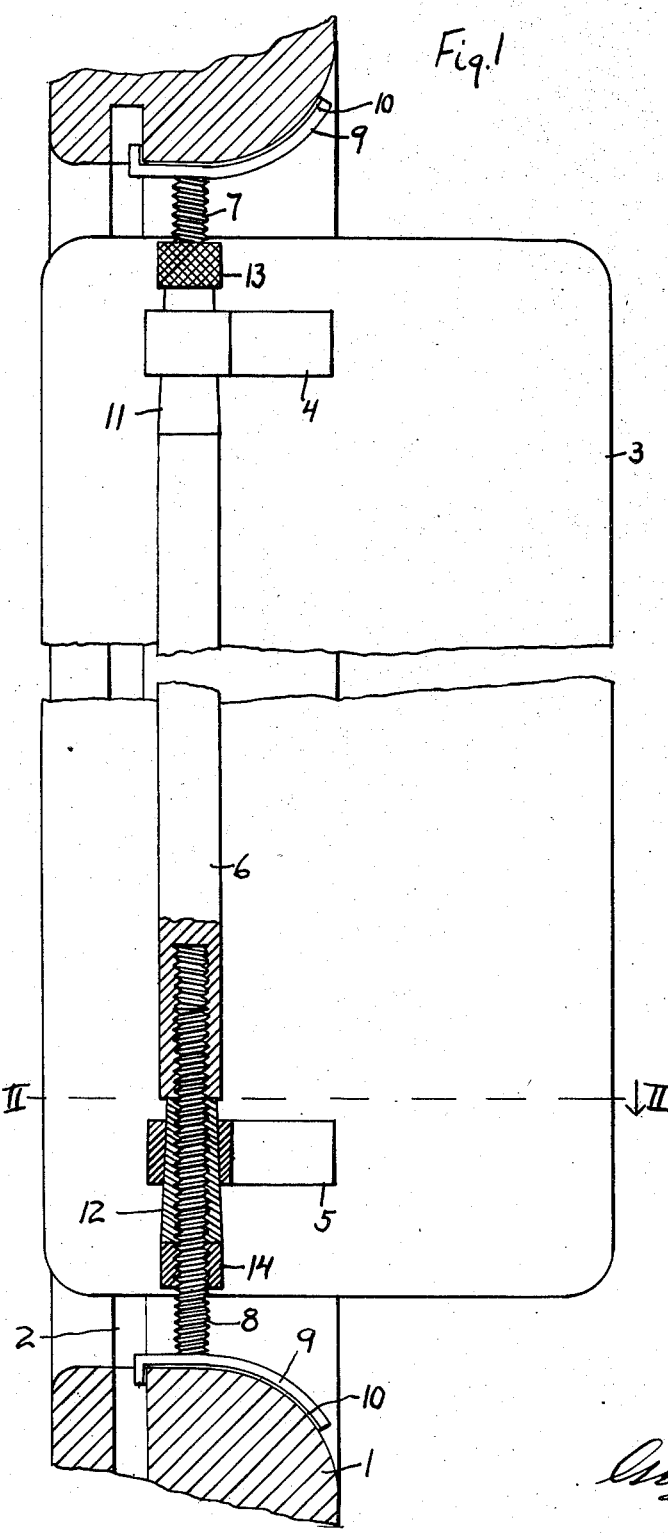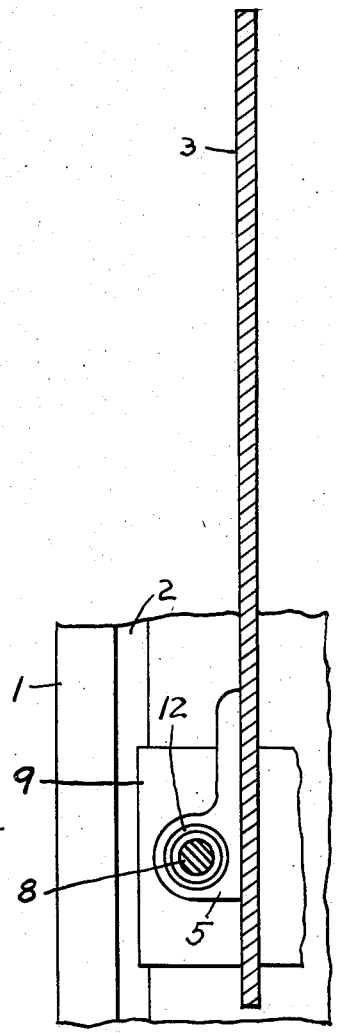

2,555,146

UNITED STATES PATENT OFFICE 2,555,146

VENTILATING DEFLECTOR

Clyde H. McNamee, Sr., Kansas City, Mo.

Application September 7, 1948, Serial No. 48,055

1 Claim. (Cl. 296—84)

This invention relates to deflectors or louvers for the purpose of directing a draft of air in a predetermined direction. The chief object of the invention is to provide a deflector of such nature that its angle of adjustment may be readily changed and which will be self-locking as far as holding its adjusted position is concerned.

Another object of the invention is to produce a device of this general character which is easily and quickly attached to or removed from a window opening or frame, and which does not require extraneous attaching devices of any kind and will not mar the finished window casing or frame.

A further object of the invention is to provide a deflector of the character described which is particularly applicable to automobile windows and may be produced in colored plastic, glass, or any desired material.

With the general objects named in view and others as will hereinafter appear, the invention consists in certain novel and useful features of construction and organization of parts as hereinafter described and claimed, and in order that it may be fully understood, reference is to be had to the accompanying drawing, in which—

Figure 1 is a vertical section through an automobile window showing the device in partial section, the deflector plate being turned at right angles to the window opening.

Figure 2 is a section on the line II—II of Figure 1 with the deflector plate parallel to the window opening.

In the said drawing, where like reference characters identify corresponding parts in all of the figures, 1 is the frame of an automobile window and 2 is the slot which forms a guide for the vertically adjustable window glass (not shown). The air deflector plate or louver 3 may be of any desired material, such as, glass, plastic or the like, and secured thereto adjacent its upper and lower edges respectively, are bosses 4 and 5, having alined internally tapered bores or passageways forming axes for the rotative adjustment of the plate and also cooperating with externally tapered portions (hereinafter described) to automatically lock the plate 3 in adjusted position against the force of any ordinary air blast.

Vertically spanning the window opening is a longitudinally extensible clamp rod 6 having an external taper 11 at its upper end fitted in the tapered opening in the block 4. In practice it will be found that the wedging action of the taper 11 in the block 4 may be relied upon to hold the deflector plate 3 in adjusted position against any normal blast of air or car vibration. However, to give the device a longer life and period of service, a second tapered rod may be provided as will hereinafter appear.

The opposite ends of the rod 6 are tapped to receive oppositely threaded bolts 7 and 8, carrying clamp shoes 9 lined with felt padding or the like 10 for gripping the frame of the window opening without marring or scratching the same. The clamp shoes 9 hook into the glass guide slot 2 and the parts are so desired that window glass operation is not hindered when the deflector plate 3 is swung to parallel the glass as shown in Figure 2. Inasmuch as the device could not be assembled within the tapered bosses 4 and 5 if the rod 6 carried two similar tapers, a second rod or tapered member 12 is threaded on the bolt 8 into abutment with the lower end, the untapered end, of the rod 6.

With the construction as shown and described it will be evident that by rotation of the rod 6 the pressure of the clamp shoes 9 against the window frame may be increased or diminished as desired. In order that the rod may be locked in adjusted position, the threaded bolts 7 and 8 carry thumb locking nuts 13 and 14. From consideration of the drawing and description, it will be apparent that after the rod 6 is clamped in the window opening, the deflector plate 3 may be swung to the desired angle by shifting it bodily to loosen the clamping or wedging engagement between the tapered surfaces. After adjustment, the plate 3 is shifted in the opposite direction to bring the tapered areas into clamping engagement with a force commensurate with that of the wind blast encountered by the deflector.

From the above description and drawing it will be apparent that I have described and illustrated a construction embodying all the features of advantage set forth as desirable, and while I have described and illustrated the preferred construction, it is to be understood that I reserve the right to all changes within the spirit and scope of the appended claim.

I claim:

A wind deflector for windows comprising a rod having right and left hand threaded bores at its opposite ends, right and left hand threaded bolts engaged with said bores respectively, clamp shoes carried by the ends of said bolts, lock nuts on the bolts for binding the rod against rotation, said rod having an external taper adjacent one end, a second rod externally tapered in the same direction as the first rod and threaded on one of said bolts and interposed between the untapered end of the first rod and the corresponding lock nut, and a deflector plate having a pair of internally tapered bosses journaled on and adapted to frictionally grip the external tapers of the rods and slidable longitudinally thereon in one direction to relieve the frictional grip so that the deflector may be adjustably positioned.

CLYDE H. McNAMEE, Sr.

REFERENCES CITED

The following references are of record in the file of this patent:

UNITED STATES PATENTS

| Number | Name | Date |
| --- | --- | --- |
| 90,330 | Wolters | May 18, 1869 |
| 158,987 | Selden | Jan. 19, 1875 |
| 743,279 | Haycock | Nov. 3, 1903 |
| 1,478,706 | Forker | Dec. 25, 1923 |
| 1,922,159 | Goldberg | Aug. 15, 1933 |
| 2,105,891 | Morrison | Jan. 18, 1938 |
| 2,146,391 | Anderson | Feb. 7, 1939 |
| 2,453,561 | Wolff | Nov. 9, 1948 |

FOREIGN PATENTS

| Number | Country | Date |
| --- | --- | --- |
| 354,479 | Great Britain | Aug. 13, 1931 |